Dec. 25, 1956   E. SCHNEEBELI ET AL   2,775,147
TAPER BORING DEVICE
Filed April 30, 1952   4 Sheets-Sheet 4

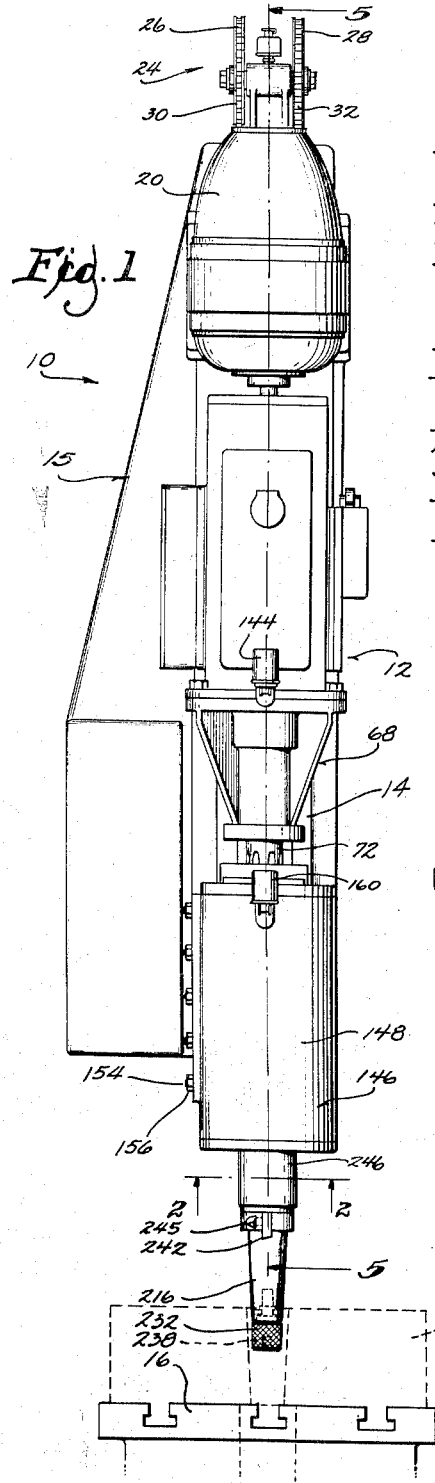

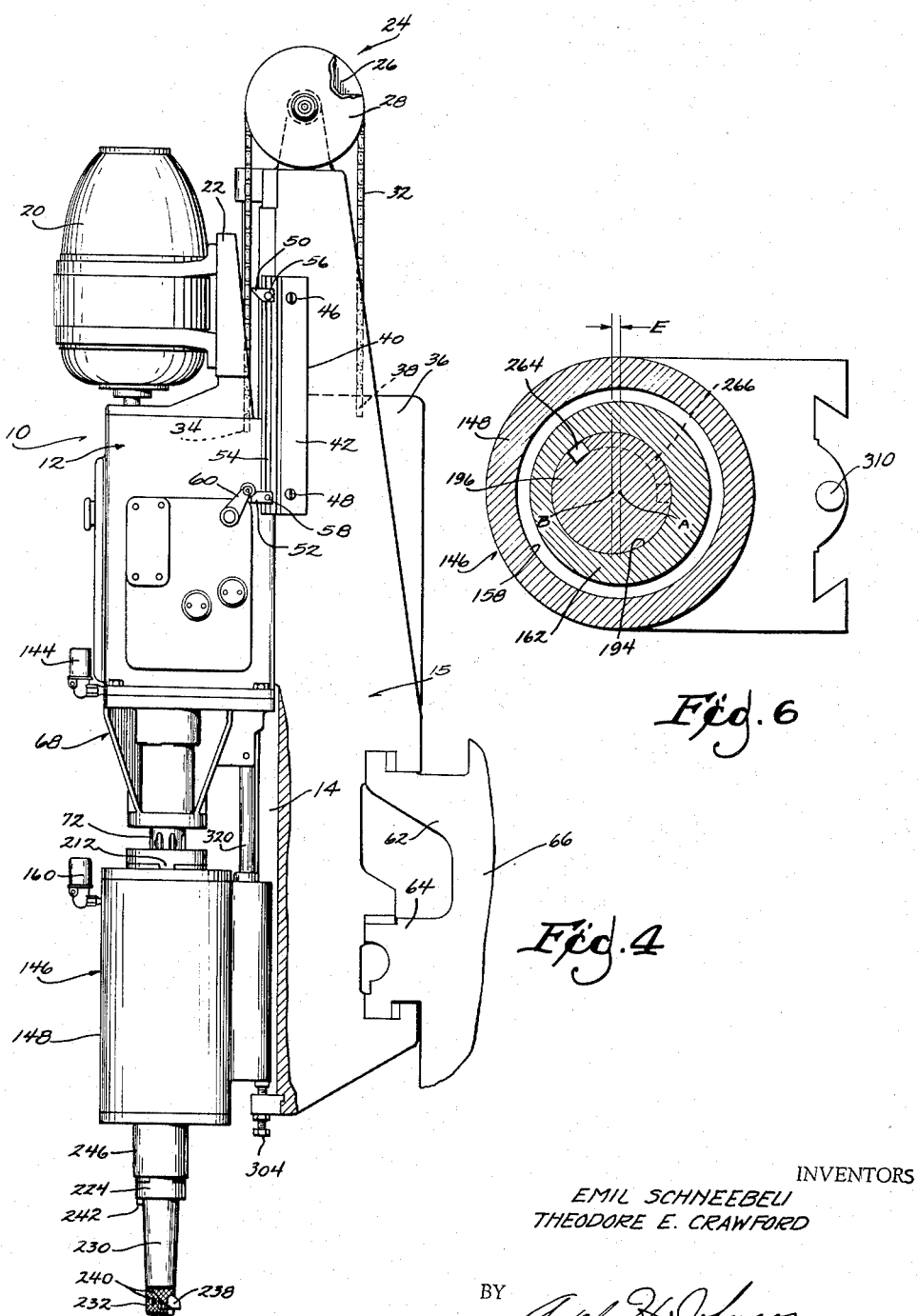

INVENTORS
EMIL SCHNEEBELI
THEODORE E. CRAWFORD
BY Axel H. Johnson,
AGENT

United States Patent Office 2,775,147
Patented Dec. 25, 1956

2,775,147

TAPER BORING DEVICE

Emil Schneebeli and Theodore E. Crawford, Racine, Wis., assignors to J. I. Case Company, Racine, Wis., a corporation of Wisconsin Application April 30, 1952, Serial No. 285,152

11 Claims. (Cl. 77—4)

This invention relates to a taper boring device intended to replace reamers and similar devices when machining tapered holes in production processes.

The reaming of tapered holes in metal machine components has been a constant source of expense and trouble. Solid reamers are expensive tools and when a tooth becomes broken the entire reamer must be discarded. When inserted-tooth reamers are employed, they require attention with respect to adjustment and, because of the nature of such tools, are of a high initial cost.

Reamers are subjected to normal wear and must be reground frequently. The grinding of reamers is an operation requiring the time of experienced tool grinders and is done by supporting the reamer on centers and traversing the grinding wheel axially along the edge of each tooth. It is clear that to do its work most efficiently a multi-tooth reamer should have teeth all of which have cutting edges which lie on the periphery, so that each tooth performs its share of the work of finishing the hole.

Modern production methods require uniformity in machining tapered holes. Such uniformity is difficult to maintain, because the reamers must be frequently reground. This regrinding is done on universal machines on which a variety of work is done. Therefore, the machine must be initially adjusted for angle each time the reamer is ground. The person setting the machine may not obtain the same setting at each grinding of the reamer; thus considerable trouble may result in obtaining tapered holes within the allowable tolerances.

When multiple tools are used such as when boring, rough reaming, and finish reaming tapered holes, it is necessary to use different speeds and feeds. The present device permits operation at one rate of speed and feed.

This invention utilizes a single-point tool which can be ground by relatively inexperienced help and which tool cost is only a small fraction of the price of a solid or inserted-tooth reamer.

An object of this invention, therefore, is to provide a boring device which does not require frequent shutdown periods for grinding or resetting for proper angle.

Another object is to provide a device which will generate a true cone.

Another object is to provide a device which makes unnecessary the use of several tools in a turret.

Another object is to provide a device which permits changing from a roughing tool to a finishing tool by merely exchanging the tool bit head for another.

Another object is to provide a boring device which requires no change in speed or feed during the boring of a hole.

Further objects and advantages of the invention will become apparent from a consideration of the following detailed description taken in connection with the accompanying drawings, wherein, a satisfactory embodiment of the invention is shown. However, it is to be understood that the invention is not limited to the details disclosed but includes all such variations and modifications as fall within the spirit of the invention.

Referring to the drawings,

Fig. 1 shows a front view of a machine unit embodying the invention;

Fig. 2 is a view in the direction of 2—2 of Fig. 1;

Fig. 3 is a section taken at 3—3 of Fig. 2;

Fig. 4 is a side view of the drill press shown in Fig. 1, embodying the invention;

Fig. 6 is a section taken at 6—6 of Fig. 5;

Figure 5:
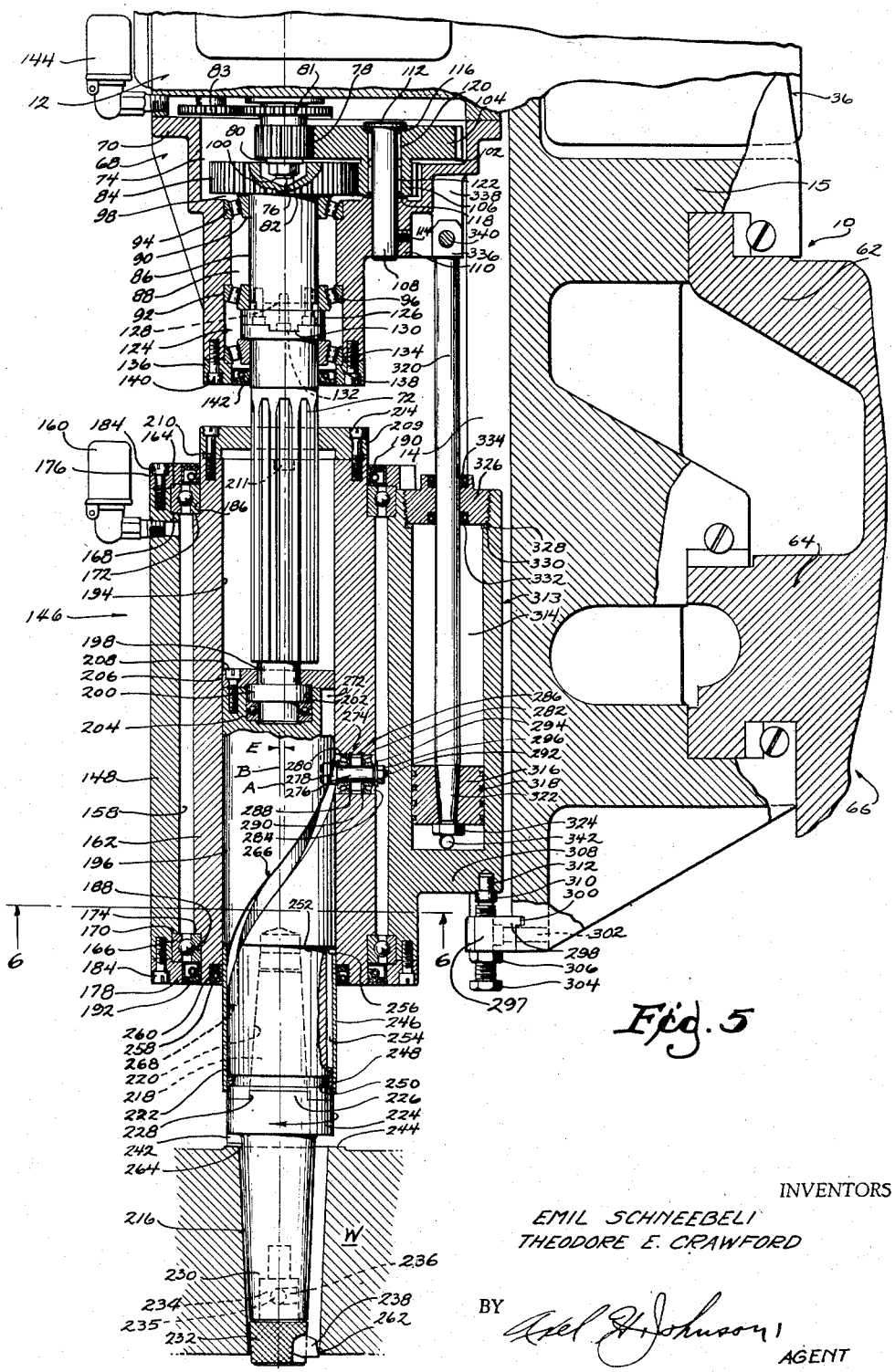
Fig. 5 is a section taken at 5—5 of Fig. 1.

Referring to Figs. 1 and 4 of the drawings, 10 is a standard vertical drilling machine of a type well known in the manufacturing field and need not be specifically described except when necessary in order to explain its relationship to the invention. A driving head 12 is arranged to be supported on a vertical dove-tail slide portion or guideway 14 and is shiftable vertically thereon in order to advance the cutting tool into the work and withdraw it upon completion of the boring operation.

Slide portion 14 is integral with a frame casting 15 which is slidable horizontally so that the work axis of the boring bar coincides with that of the axis of rotation of the work piece. The relationship of frame casting 15 will be further discussed as the description progresses.

Head 12 is a self-contained commercially obtainable unit provided with a hydraulic means in order that the head can be traversed vertically. The hydraulic means above referred to is built into the head 12 as a unitary part thereof and will not be further described at this time.

Drilling machine 10 is provided with a rotatable work table 16 to which the work piece 18 is secured by the use of clamps or other appropriate fixtures. In this instance the work table 16 rotates in order that various tools mounted on other tool holders may be employed to carry out other machining operations on the work piece simultaneously with the taper boring operation.

The power necessary to operate the driving head 12 is obtained from a motor 20, which is secured integrally with head 12 by means of a bracket 22 which forms a part of head 12, and moves with the latter when the boring operation is performed.

A counter-balancing arrangement 24 is provided in order to relieve the hydraulic traversing mechanism by supporting the weight of the boring unit. Thus, the hydraulic traversing mechanism is applied only to overcome the resistance on the dove-tail slide 14. Counter-balancing arrangement 24 comprises a pair of pulleys 26 and 28 journalled on the drilling machine 10. A pair of chains 30 and 32 pass over pulleys 26 and 28 as shown in Figs. 1 and 4. One end of chains 30 and 32 is anchored in the top of head 12 as at 34. The other ends of chains 30 and 32 are anchored in a weight 36 which hangs in a convenient position at the back of drill press 10 as shown in Fig. 4, one such anchor means being designated as 38.

A stop means 40 serves to provide limit stops for the upper and lower extremities of travel of the driving head 12. Stop means 40 comprises a slotted bar 42 secured to the frame casting 15 of drilling machine 10 by screws 46 and 48. A pair of limit stops 50 and 52 are adjustably secured in a slot 54 by screws 56 and 58. Head 12 is provided with a trip lever 60 which strikes either stop 50 or 52 when head 12 reaches either the upper or lower limit of its travel on slide 14. As stops 50 and 52 are adjustable in slot 54, the distance of travel of head 12 and its height from the work piece can be controlled by merely adjusting the stops.

Slide 14 is integral with frame 15 as mentioned above, the latter being slidable horizontally on gibs or ways 62 and 64 of the base frame 66 which supports the drilling machine from the floor.

A gear case 68 having a flange 70 as shown in Fig. 5 is secured to the lower face of driving head 12 by screws or other suitable means of fastening. A splined drive shaft 72 extends downwardly from gear case 68 on a vertical axis, and which will be explained in detail below. Gear case 68 is provided with a gear cavity 74 adjacent the face of driving head 12 in order to accommodate the necessary driving gears.

A drive shaft 76 extends from driving head 12 and has keyed or otherwise affixed thereto a main drive gear 78. A washer 80 and a nut 82 serve to retain gear 78 on shaft 76. In this instance the axis A of drive shaft 76 coincides with the axis of splined shaft 72. Gear 78 has integral therewith a gear 81 which in turn drives a gear 83. Gear 83 operates a hydraulic pump within the driving head 12 and is not a part of this invention.

A spindle gear 84 is positioned with the axis thereof coincident with that of splined shaft 72. Gear 84 is provided with a shank 86 which is integral therewith and provides axial support for gear 84. Gear case 68 is apertured as at 88 to permit space for lubricant.

Roller bearings 90 and 92 provide the bearings for shank 86, as shown in Fig. 5. Recesses 94 and 96 provide seats for bearings 90 and 92 respectively, the outer races of the bearings being pressed into place in the recesses and the inner races thereof fitted to the shank 86. One or more suitable shims 98 are inserted between the inner race of bearing 90 and the gear 84 in order to obtain proper axial position of the gear 84. Gear 84 is recessed as at 100 to receive nut 82.

A compound gear 102 provides the means to drive gear 84 from gear 78 at a lower rate of speed than that obtainable directly from gear 78. Gear 102 comprises two unitary gears 104 and 106 integral with each other and having a common axis. A journal pin 108 having an axis parallel to that of gears 78 and 84 is fitted in a boss 110 in gear case 68, as shown in Fig. 5. Pin 108 is provided with a head 112 which serves to prevent gear 102 from being axially displaced. A set screw 114 is threadedly engaged in boss 110 and is brought to bear against a flat portion on pin 108 thus, preventing axial displacement of the latter. Thrust washers 116 and 118 resist thrust in an axial direction induced by axial movement of gear 102. Washer 116 is placed in a recess under head 112 and washer 118 is interposed between gear 106 and the face of boss 110. Washers 116 and 118 are made of hardened steel or any other material suitable for thrust washers.

In order to lessen friction between pin 108 and gear 102, a pair of needle bearings 120 and 122 are employed and are inserted between pin 108 and the bore of gear 102.

The upper end of shaft 72 terminates at a point below the end of shank 86 as shown in Fig. 5. A coupling 124 of the type known as an Oldham coupling is employed to transmit the rotation of gear 84 to shaft 72. Coupling 124 comprises a cylindrical member 126 inserted between the ends of shank 86 and shaft 72. Member 126 is provided with tongues 128 and 130 on opposed ends and which tongues are radially positioned at right angles to each other. Tongue 128 is loosely fitted into a slot in shank 86 and tongue 130 is loosely fitted into a slot in the end of shaft 72. Thus a rotation of gear 84 will result in rotation of shaft 72. Screws 132 serve to hold member 126 in place against shank 86.

A taper roller bearing 134 is inserted in the lower portion of bore 88 of gear case 68 and provides a journal for the upper end of shaft 72. A cap 136 is fitted over the end of case 68 and is provided with a recess 138 of a diameter to receive the outer race of bearing 134. A plurality of screws 140 serve to hold cap 136 securely in contact with case 68.

A comercial grease seal 142 is inserted in the inner bore of cap 136 and the leather ring thereof contacts shaft 72 as shown in Fig. 5, thus effectively sealing the gear case against leaks. A commercially obtainable oil cup 144 is provided in gear case 68 for the purpose of maintaining an oil level.

The taper boring head 146 which substantially comprises the invention is slidably positioned on slide 14 below the driving head 12. Head 146 comprises a body casting 148 which is provided with a dove-tail portion 150 as shown in Fig. 2. A means of taking up wear is provided in the form of a conventional shim 152 which is adjusted to the dove-tail slide 14 by a plurality of set screws 154 and lock nuts 156, as shown in Fig. 1. Body 148 has machined therethrough a cylindrical bore 158 which has an axis coincident with axis A of shaft 72, as shown in Fig. 5. An oil cup 160 is threaded into the upper portion of body 148 in order to provide lubrication for the rotating members now to be described.

A quill 162 is rotatably positioned in bore 158 and is substantially of smaller diameter than bore 158. Quill 162 is adapted to rotate about the axis A, coincident with that of shaft 72 and is keyed thereto by means which will be described later. Quill 162 is journaled in bore 158 by a pair of anti-friction bearings 164 and 166. To assure adequate support for quill 162 against axial pressure of the tool against the work, bearings 164 and 166 are seated in recesses 168 and 170. Quill 162 is provided with step portions 172 and 174 which lie in the same normal planes as their corresponding recesses 168 and 170. Thus, bearings 164 and 166 will seat accurately upon both the recesses in body 148 and the step portions on quill 162, with an equal pressure and with a minimum amount of end-play. In order to hold bearings 164 and 166 in their recesses against tool pressures and other forces which would tend to displace them, a pair of caps 176 and 178 are employed.

Caps 176 and 178 have an inner bore, which substantially coincides with that of the inner diameter of the outer races of bearings 164 and 166. Caps 176 and 178 are provided with recesses 180 and 182, which accommodate the outer diameter of bearings 164 and 166, thereby, providing support for caps 176 and 178 against displacement normal to the axis A of the quill 162. A plurality of screws 184 serve to secure caps 176 and 178 to the body 148.

The provision of step portions 172 and 174 results in reduced diameters 186 and 188 at the ends of quill 162. In order to prevent lubricant leaking from bore 158 a pair of commercially available grease retainers 190 and 192 are employed. Retainers 190 and 192 are press fits in the inner diameters of caps 176 and 178. The leather elements of retainers 176 and 178 make grease-retaining contact with the reduced diameters 186 and 188 respectively, as shown in Fig. 5.

Quill 162 is provided with a cylindrical bore 194, having an axis B eccentric with axis A by an amount E, as shown in Figs. 5, 6, 7, and 8. Eccentricity E equals $(D-d)/4$, where D equals the large diameter of the tapered hole to be bored and $d$ equals the small end thereof.

A spindle 196 is provided which is made an accurate sliding fit in bore 194, and of a length to allow sufficient traverse to perform the boring operation. Fig. 5 shows spindle 196 in the extreme low position. Spindle 196 rotates about the axis B which, as before described, is eccentric to axis A.

Shaft 72 is of sufficient length to extend downwardly into bore 194 with the lower end thereof terminating in an anchor means for spindle 196. Shaft 72 has provided at the lower end thereof a necked portion 198, which is concentric with axis B and, therefore, concentric with spindle 196. Portion 198 is machined as an integral part of shaft 72, and which shaft terminates in an enlarged portion 200, the latter also being concentric with axis B.

The upper end of spindle 196 is provided with a recess 202 of sufficient depth to accommodate a thrust bearing 204 and a portion of the length of enlarged portion 200, as shown in Fig. 5. A collar 206, made in halves to allow assembling about necked portion 198, anchors enlarged portion 200 in recess 202 and in contact with thrust bearing 204. A plurality of screws 208 secure collar 206 to spindle 196. The purpose of enlarged portion 200 is to compel spindle 196 to be drawn upwardly into bore 194, when shaft 72 is traversed upwardly. The purpose of thrust bearing 204 is to reduce the resistance of spindle 196 to rotate under the axial pressure induced by the cutting operation.

A driving cap 209 is splined to shaft 72, as shown in Fig. 5, so that shaft 72 drives cap 209, but the latter is capable of sliding axially thereon. Cap 209 and quill 162 are provided with interengaging circumferential recesses at 210 to assure positive axial alignment between these members. A pair of diametrically positioned key portions 211 and 212 serve to transmit the driving force of shaft 72 to quill 162. Screws 214 are employed to secure cap 209 to the upper end of quill 162.

Spindle 196 extends downwardly beyond the lower end of quill 162 and has affixed, thereto, the boring bar 216, as shown in Fig. 5. Boring bar 216 is provided with a tapered shank 218 which fits into a corresponding hole 220 in spindle 196. Spindle 196 has a reduced portion 222 the purpose of which will be explained below. Boring bar 216 is provided with an enlarged portion 224 at the base of tapered shank 218, which enlarged portion is of slightly smaller diameter than the reduced portion 222 for purposes, which will appear. Enlarged portion 224 is slabbed on the upper face, thereof, to provide a driving key 226. The lower end of spindle 196 is provided with a slot 228 corresponding to the key 226. The key 226 and slot 228 are not symmetrically located about axis B of spindle 196 or tapered hole 220, so that boring bar 216 can only be inserted in hole 220 in one position. The purpose of this arrangement will be clear after further description.

Boring bar 216 has an extension 230 which forms the boring bar proper. In this instance, extension 230 is tapered to approximately conform to the taper of the hole being bored. In order to allow the use of a roughing tool and a finishing tool, a cutting tool head 232 is provided. This head is knurled to facilitate gripping, so that it can be inserted in, or removed from the shank 230. Head 232 is provided at the upper portion, thereof, with a shank portion 234, which is provided with a pair of diametrically opposed bayonet-type slots, one of these slots being indicated as 236. A pair of diametrically opposed pins 235 are fixed in extension 230, only one being shown engage the bayonet slots and serve to lock the head 232 upon a rotation of the latter. Rotation in the opposite direction releases the head 232, so that it can be removed and replaced by a head provided with either a roughing or finishing cutter.

A suitable cutting bit 238 is secured in head 232 and set screws 240 (see Fig. 4) serve to secure the bit 238 in place. In this instance, a second cutting bit 242 is employed to provide means to face the edge 244 of the work piece. Cutting bit 242 is held in enlarged portion 224 by a set screw 245, as shown in Fig. 1.

Reduced portion 222 of spindle 196 extends to a point substantially within the bore 194, when the spindle is in its extreme downwardly extended position. A sleeve or tubing 246 is made an accurate fit about reduced portion 222 and having an outside diameter of that of spindle 196. Sleeve 246 extends the length of reduced portion 222 and terminates at a point adjacent the slot 228. A dust seal 248 is inserted in an annular groove 250 and is of a proportion to make frictional contact with the inner wall of sleeve 246.

When spindle 196 is in the extreme point of downward travel, sleeve 246 abuts shoulder 252 and does not uncover the dust seal 248. A slot 254 is provided longitudinally on spindle 196, and which extends from adjacent shoulder 252 to a point short of groove 250. A pin 256 is fixed on sleeve 246 at the upper end, thereof, as shown in Fig. 5.

A commercial dust seal 258 is a press fit in an annular recess 260 in quill 162. The leather seal element thereof makes frictional contact with sleeve 246. When spindle 196 travels upwardly sleeve 246 is retained in the low position owing to the friction between the sleeve and the seal element until pin 256 encounters the lower end of slot 254. Further upward travel of spindle 196 will carry sleeve 246 with it. Thus sleeve 246 always covers dust seal 248 over the entire axial travel of the spindle 196.

One novel feature of this invention is a cam arrangement which rotates spindle 196 through an angle of 180 degrees relative to quill 162, while the latter rotates at the proper boring speed. Simultaneously with the above mentioned rotation of 180 degrees, spindle 196 advances axially relative to quill 162 a distance equal to the length of the hole being bored, quill 162 being prevented from axial displacement during this advance of spindle 196.

Figure 8:
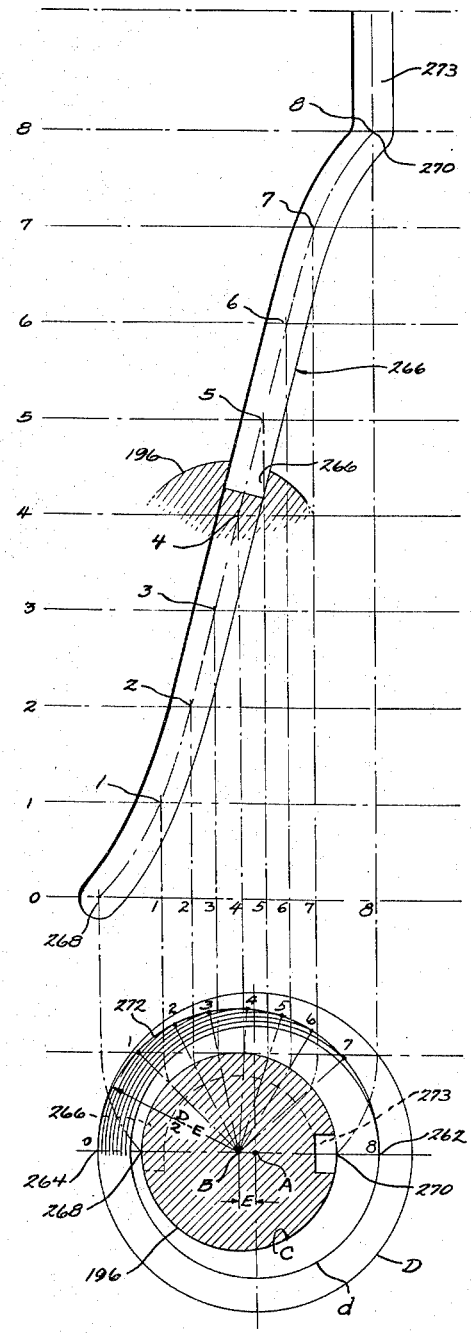
Fig. 8 is a geometrical view showing the development of the cam.

Referring to Fig. 5, tool bit 238 is shown at the small end of a tapered hole being bored in a work piece W, and at point 262. When tool bit 238 is in the initial position which is the large end of the hole it will be positioned at point 264. Referring to Figs. 5, 6, 7, and 8, a cam slot 266 extends longitudinally along the periphery of spindle 196 subtending an arc of 180 degrees. Referring to Fig. 8, cam slot 266 is initiated at point 268 and terminates at 270. It should be understood that Fig. 8 is merely intended to aid in understanding the mathematical basis for this invention and not to show mechanical proportions of the various elements.

Referring to Fig. 8, circles D and d designate the major and minor diameters of the tapered hole to be bored. C represents the major diameter of the spindle 196, and E signifies the amount of eccentricity necessary to bore a hole of the desired taper. Referring to the cam development in Fig. 8, the numbers reading vertically from 0 to 8 represent the length of the hole being bored, in inches. The circumferential distance 268—270 on the periphery of circle C subtends an arc of 180 degrees and is projected to the horizontal line 0–8 in order to obtain the development of the cam 266. The contour of the cam is then obtained by projecting horizontal lines from the vertical numbers 0–8, and vertical lines from the horizontal numbers 0–8. The resulting intersection of these horizontal and vertical lines determine the curve of the cam groove.

An inspection of Fig. 8 will indicate that the space between diameters D and d has been divided into eight parts, one part for each inch of depth of the hole to be bored. Using axis A as a center, arcs are drawn corresponding to the above mentioned eight parts. To determine points 0–8 about the circumference of circle C an arc 272 is drawn from points 262 to 264 using axis B as a center. The intersection of arc 272 and the eight arcs above mentioned determines the points through which the radial lines 0–8 pass.

The factor E equals $(D-d)/4$ and the radius of the arc 272 equals $D/2-E$, where E equals the eccentricity between axes A and B, D equals the major diameter of the tapered hole to be bored, d equals the minor diameter thereof, and L equals the length of the hole being bored.

An extension 273 of cam groove 266 terminates at the upper end of spindle 196. The purpose of extension 273 will be made clear later in the description.

A cam follower 274 is provided in quill 162 to engage the cam 266 and to initiate the hole from point 264 and to accurately guide the rotation of the spindle to the termination of the tapered hole at point 262. It is important that cam follower 274 follow cam 266 with a minimum amount of error.

Referring to Fig. 5, follower 274 comprises a freely rotatable follower spindle 276 having at one end thereof, an enlarged portion 278 adapted to engage cam slot 266.

Portion 278 is an accurate fit in slot 266. In order to assure freedom of rotation of the follower, spindle roller bearings 280 and 282 are employed. A hole 284 is bored radially in the wall of quill 162 of a size to accommodate the outer races of bearings 280 and 282. A spacer 286 is inserted in hole 284 intermediate two snap rings 288 and 290. Bearings 280 and 282 abut rings 288 and 290 respectively. Follower spindle 276 is provided at one end thereof with a threaded portion 292. A washer 294 contacts the side of the inner race of bearing 282. The shoulder formed between the spindle 276 and enlarged portion 278 abuts the face of the inner race of bearing 280. A nut 296 is assembled on threaded portion 292, and a cotter or other lock means is inserted therethrough. This assembly assures a freely running follower and one not liable to become loose owing to wear. It will be clear that follower 274, in addition to being a guide for the rotation of spindle 196, is also the sole means of rotating the spindle both for its boring function and relative to the quill 162.

Figure 7:
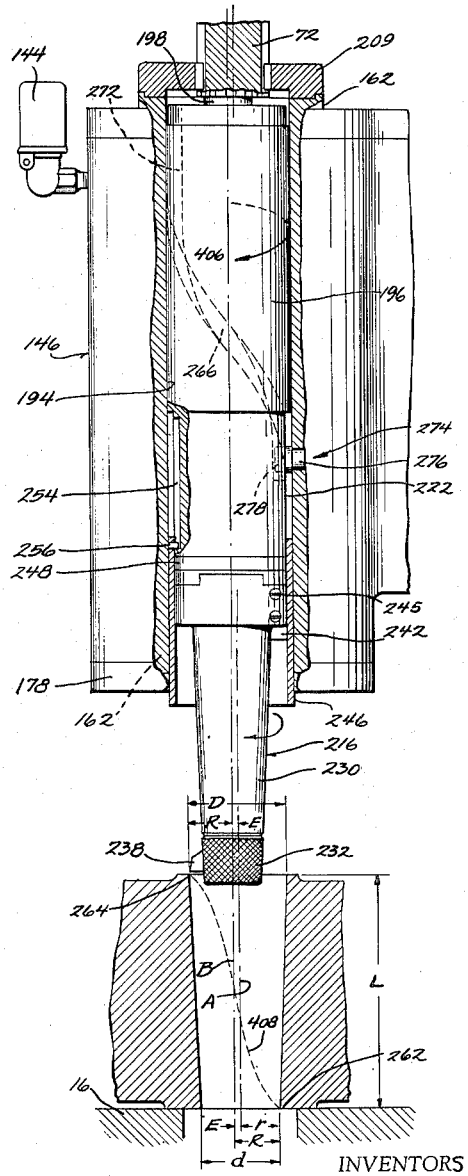
Fig. 7 is an axial section showing the cutting bit at the starting point of the tapered hole.

In order to prevent chips and dirt getting into the lower end of cam groove 266, sleeve 246 is arranged so that the latter always covers the lower end of the groove. However, slot 254 is so proportioned that pin 256 can move downwardly therein and allow sleeve 246 to clear the lower end of groove 266, so that the latter can reach the enlarged portion 278 of the follower 274, as shown in Fig. 7. It will be clear that any portion of groove 266 may be used, for example when a short hole is being bored, and obtain the same taper per inch.

A stop block 297 is secured at the lower end of frame casting 15, as shown in Figs. 4 and 5, and is keyed to casting 15 by a tongue 298 which is fitted in a groove 300 in the casting 15. The purpose of key is to prevent displacement of block 297. Block 297 is secured to casting 15 by use of a plurality of screws 302, as shown in Figs. 2 and 5.

A stop screw 304 is threadedly engaged in a hole in block 297 and is of a length sufficient to allow substantial adjustment. A lock nut 306 is threadedly engaged on screw 304 and abuts block 297 in order to lock the screw against turning after an adjustment has been made.

Body casting 148 is provided with a portion 308 which extends rearwardly over the screw 304. Portion 308 has affixed thereto a contact member 310 which is coaxial with screw 304 and provided with a shank 312, the latter being pressed into a hole in portion 308. The screw 304 and contact member 310 are hardened so as to make their mutually-contacting surfaces more durable.

A "dash pot" arrangement 313 is provided as an integral part of body casting 148, as shown in Figs. 3 and 5. One purpose of this arrangement is to provide means to hold the boring head 146 in positive contact with adjusting screw 304 against any tendency of the head to lift owing to vibration caused by the cutting tool while the driving head is feeding the spindle downwardly. An inspection of Figs. 3 and 5 will reveal that the present arrangement, while holding the head 146 in positive contact with screw 304, allows the driving head 12 to move downwardly with very little resistance.

Dash-pot arrangement 313 comprises a hydraulic cylinder 314 having its axis parallel to that of bore 194 of quill 162. A piston 316 is provided in cylinder 314 and has piston rings 318; four being employed in this instance. Piston 316 and rings 318 must resist hydraulic pressure exerted on both sides of piston 316, as will later appear. A piston rod 320 having a tapered end 322 as shown in Fig. 5, fits piston 316, and a nut 324 holds piston 316 and rod 320 together as a unit.

A cap 326 having a sliding fit over rod 320 is threadedly engaged in the top of cylinder 314. Cylinder 314 is provided with a sealing washer 328 inserted in a seat 330 near the top of cylinder 314 and cap 326 seats on washer 328 in order to provide a seal against leakage of fluid from the cylinder 314.

A pair of sealing members 332 and 334 are inserted in cap 326. Seal 332 is on the cylinder side of cap 326 and serves to seal against hydraulic leakage from the cylinder 314. Seal 334 is on the outside of cap 326 and prevents dirt and chips from entering the cylinder around the piston rod 320.

Piston rod 320 extends upwardly and terminates in an eyelet 336. Gear case 68 is provided with a bifurcated bracket 338 to which piston rod 320 is secured. A pin 340 secures rod 320 to bracket 338 so that piston 316 is carried vertically by driving unit 12 and moves with the latter.

Referring to Figs. 3 and 5, a passage 342 extends laterally from cylinder 314 and terminates in a pipe plug 344. A passage 346 extends from passage 342 in a direction parallel to cylinder 314. A passage 348 extends laterally from the upper end of cylinder 314 and terminates in a pipe plug 350. A check valve 352 is provided which comprises a valve seat 354, which is pressed into a cavity 356 concentric with passage 346. A valve body 358 is threaded into a cavity 360 and is provided with a castellated portion 362 in order to allow fluid to flow from passage 346 to passage 348. Valve body 358 has provided therein a cylindrical cavity 364 which forms a cage for a check-valve ball 366 which rests upon seat 354. A spring 368 rests upon ball 366 and has a cap 370 resting thereon and which fits freely in cavity 364. A set screw 372 is threadedly engaged in body 358 and bears against cap 370. The pressure on ball 366 can be adjusted by merely turning screw 372, until the desired resistance to flow of fluid from passage 346 into cylinder 314 has been obtained. Thus the velocity of movement of piston 316 downwardly can be easily regulated. A nut 374 serves to lock screw 372 after the desired adjustment has been obtained.

A passage 376 extends laterally from cylinder 314 and terminates in a pipe plug 378. A check valve 380 is provided to prevent flow of fluid from cylinder 314 through passage 376 for reasons which will later appear. A cavity 382 is provided in body 148 and which intersects passage 376, and terminates in a seat 384. A restricted passage 386 is provided which is co-axial with cavity 382. A check-valve ball 388 of a size to fit freely in cavity 382, rests against seat 384. Ball 388 must leave sufficient space around its periphery to allow fluid to pass through cavity 382 when the ball lifts from the seat 384. A spring 390 rests upon ball 388 and is proportioned so as to assure positive seating of ball 388 against seat 384. A threaded cap 392 is fitted to cavity 382 and which is provided with a cavity 394 into which spring 390 is seated.

An enlarged passage 396 connects passage 386 and extends in a direction generally parallel to cylinder 314. A threaded pipe plug 398 serves to close the end of passage 396.

A passage 400 extends laterally from the upper end of cylinder 314 and terminates in a pipe plug 402. Passage 400 terminates in a pipe plug 402. Passage 400 connects cylinder 314 with passage 396 to allow passage of fluid. The purpose in providing passage 396 of an enlarged diameter is to provide space for fluid which is being forced from the lower face of piston 314 through passages 342, 346, and 348 and into the cylinder at the top thereof. The upper portion of cylinder 314 is reduced in volume by the presence of piston rod 320 and therefore, the oil forced from the lower face of piston 316 being in excess of the capacity of the upper portion of the cylinder 314 must flow through passage 400 into passage 396. In order to periodically inspect the fluid level in the system, a passage 403 connects passage 396 and is provided with a threaded pipe plug 404 which serves to close passage 403, and which plug may be removed, so that the fluid level may be checked.

In summarizing, the operation of the boring device will now be described. The work-piece W is secured to table 16 in any suitable manner, the latter being arranged to rotate by means not necessary to describe. Stops 50 and 52 are adjusted so that contact of trip lever 60 with the stops will limit the movement of head 12 to that necessary to traverse the length of the tapered hole in the work-piece W.

Stops 50 and 52 can be adjusted at various positions to accommodate holes of different lengths by shifting them along slot 54. As lever 60 strikes one of the stops, 50 and 52, it rotates, thus actuating the mechanism in the head 12 and reversing the direction of travel of the latter in well known manner. Generally the stops 50 and 52 are set so that the tool bit 238 traverses the hole to a point beyond each end thereof, thereby avoiding unfinished holes.

Referring to Fig. 5, it will be noticed that piston rod 320 is connected to head 12 and moves with the latter. When a tapered hole is to be bored the controls are actuated which initiates the downward traverse of head 12. At this time piston 316 is at the upper end of cylinder 314 and the lower portion of cylinder 314 and passages 342, 346, and 376 are full of fluid, which is blocked by check valves 352 and 380. In this instance any fluid pressure exerted by the fluid against ball 388 holds the latter against seat 384 allowing no fluid to pass into passage 386.

The pressure of fluid against ball 366 is resisted by spring 368 and which resistance can be adjusted by turning screw 372. The purpose of the adjustment will appear as the description progresses.

As head 12 moves downwardly, boring head 146 is compelled to move with it, owing to the resistance of the fluid in cylinder 314 reacting against the underside of piston 316. Head 12 and head 146 move downwardly simultaneously until contact member 310 of head 146 makes contact with screw 304. Screw 304 is adjusted so that when contact member 310 strikes it, the cutting bit is in position to enter the hole to be bored.

Driving head 12 and boring head 146 move downwardly simultaneously until contact member 310 and screw 304 engage. Boring head 146 then comes to rest while head 12 and piston 316 continue to move, the latter forcing the fluid from the cylinder out through passages 342, 346, and 348 into the upper chamber of cylinder 314.

The primary purpose in employing a hydraulic cylinder is to provide a positive means of holding the boring head 146 in working position against any possible upward reaction of the cutting process during the entire traverse of the hole. If it is found that too much resistance is offered to the downward movement of the piston 316, screw 372 is turned outwardly, thus, allowing the fluid to flow more freely into the upper chamber of cylinder 314. If it is found that cutting bit reaction upwardly owing to vibration or any other force is excessive and forces the head 146 upwardly and away from the contact screw 304, screw 372 is turned downwardly, thus, increasing the resistance to flow of fluid from beneath the piston 316 and resulting in head 146 remaining in its initial cutting position.

When cutting bit 238 has emerged from the small end of the hole, lever 60 strikes stop 52, thus, reversing the traverse mechanism in head 12 causing the latter to travel upwardly until lever 60 strikes stop 50, stopping the movement of head 12.

Referring to Fig. 3 it will be noticed that when fluid is transferred from the bottom of cylinder 314 to the upper portion thereof an equal quantity of fluid will not find space therein owing to the presence of piston rod 320. Therefore, the excess fluid flows through passageway 400 into passageway 396.

As head 12 is reversed and travels upwardly, piston 316 follows and transfers the fluid from the upper portion of cylinder 314 to the lower portion thereof. In this instance the fluid passes through passageways 400, 396, 386, and 376 and into the bottom of cylinder 314. As piston 316 moves upward in cylinder 314, the fluid fills the lower chamber of the cylinder. It is important, on the upward traverse of head 12, piston 316 moves to the upper end of cylinder 314. There is a tendency for this to occur since head 146 has considerable mass, and resistance to movement because of friction in guides 152, and piston 316 acting through fluid pressure, represents the normal means for raising head 146. It is also desirable, however, that head 146 shall start to rise at the time that head 12 starts its upward traverse. If head 146 were to remain at its lowermost point, cam 266 would retrace substantially exactly its pattern of downward movement, as would bit 238 and scratching of the finished bore would result. As will be apparent, if head 146 should move upwardly simultaneously with head 12, no relative movement would take place between cam groove 266 and follower 276; bit 238 would continue to rotate at its minimum eccentricity from axis A and accordingly would break contact with the work immediately upon upward travel. While this would avoid scratching, it would leave the entire upward traverse of head 146 to the last part of the movement of head 12, namely the part remaining after arrival of piston 316 at the upper end of cylinder 314, which would also be undesirable. If, on the other hand, head 146 should traverse upwardly immediately upon upward travel of head 12, but at a slower rate, bit 238, while increasing its eccentricity with upward travel, would do so at a lower rate per inch of traverse than the amount of increase per inch on its downward or boring stroke. As a result bit 238 would clear the work on its upward traverse and scratching would be avoided. Such immediate, but slow raising of head 146 is brought about as follows:

Initial movement of head 12 causes corresponding movement of piston 316 which, owing to the substantially incompressible nature of the oil or fluid with which cylinder 314 is filled, immediately generates pressure in cylinder 314 above piston 316. This pressure acts on head 326 and lifts the entire structure of head 146. This pressure, however is sufficient to force ball valve 388 off of seat 384 against the pressure of spring 390 so that the fluid flows through passages 400, 396, 386, and 376 around to the underside of piston 316, allowing upward movement of the latter relatively to cylinder 314 and accordingly upward movement of head 12 and cam groove 266 respectively relatively to head 146 and follower 278. Such movement, however, is slow since valve 388, and also the restricted character of passage 386, offer resistance to the flow of fluid, and in practice this resistance is so adjusted that piston 316 will reach the top of cylinder 314 at about the same time that head 12 reaches the top of its traverse, at which time the parts will be in position to repeat the operation of boring.

When a hole is to be bored in work-piece W, drive head 12 is traversed downwardly until contact member 310 rests against screw 304. Owing to the fluid in cylinder 314, piston 316 is retained at the top of cylinder 314, and spindle 196 is at its upper position as shown in Fig. 7. In this stage of the operation of the boring head, spindle 196 has assumed a position, where the lower end 268 of cam slot 266 is adjacent follower 274. Cutting bit 238 is in cutting position adjacent point 264. The axis of rotation A of the boring bar 216 coincides with that of quill 162, which is also the axis about which the hole being bored is generated.

After contact member 310 and screw 304 have contacted, head 12 continues to move downwardly and at this point in the operation the various members are in the position shown in Fig. 7. Shaft 72 rotates at the proper speed and drives quill 162 through the splines. As shaft 72 moves downwardly, it traverses spindle 196 along the bore 194. Follower 274 being mounted in the wall of quill 162 and engaged with cam slot 266 compels the spindle 196 to rotate with it. As spindle 196 moves downwardly in bore 194, it is compelled to rotate relative to the latter in the direction of the arrow 406, as cam slot 266 is guided by follower 274. The path taken by cutting bit 238, incident to the guidance of cam slot 266, is indicated by dotted line 408 of Fig. 7. Path 408 is initiated at point 264 and subtends an arc of 180 degrees, terminating at point 262.

R is the radius of the cutting edge of bit 238 from the axis of rotation of spindle 196 within bore 194. The radius of the upper end of the hole being bored equals R plus E. After spindle 196 has rotated 180 degrees about axis B within bore 194, cutting bit 238 has reached point 262. Owing to eccentricity E, the radius r of the hole at the lower end is R minus E.

It will be clear from a study of Fig. 7, that there are two axes of rotation, one about A, which is the axis of generation of the hole being bored and about which quill 162 rotates, and the other about B which is the axis of rotation of spindle 196 in bore 194 about which cutting bit 238 rotates, the latter being limited to a rotation of 180 degrees relatively to quill 162 for each traverse L of a hole.

The nature of the curve of cam slot 266 is such that the traverse of bit 238 through the tapered hole results in the generation of a hole having a true cone shape. The length of the slot 266 is established by the length of hole to be bored.

Fig. 7 shows the path taken by the tool 238 in the process of boring a tapered hole. As spindle 196 is traversed downwardly, the engagement of cam slot with follower 274 compels spindle 196 to rotate in bore 194. The initial position of tool 238 is indicated at 264, which is a distance E plus R from the axis of the hole being bored. Therefore, E plus R equals the radius of the hole being bored.

As spindle 196 is traversed through the hole it follows a path 408 and finally terminates at 262 at the small end of the tapered hole. The point 262 is a distance R—E from the axis of the hole being bored. It will be clear that the shape of the cam is such that the diameter of the tapered hole at any point throughout the length of the bore will be proportionate to the distance traversed axially.

The mathematical basis for the contour of cam slot 266, while capable of calculation, is not set forth, as the contour was obtained empirically. A new cam must be generated for each departure with respect to taper per inch.

The above being a complete description of an illustrative embodiment of the invention, what is claimed as new and desired to be secured by Letters Patent of the United States is:

1. In a machine tool having a frame and a vertical slide, a taper boring device comprising a drive head having a splined drive shaft and being shiftable on said slide, a boring head shiftable on said slide and comprising a body, a quill rotatable co-axially with said shaft and provided with an internal bore eccentric with said shaft, said shaft being of a length sufficient to extend within said internal bore, a splined cap, slidable on said shaft and secured to said quill, an extension on said shaft concentric with said internal bore, a spindle rotatable in said bore and provided with a cutting tool, means to connect said extension and said spindle for independent rotation, said spindle having a helical cam slot extending 180 degrees about the periphery thereof, a follower in said quill co-acting with said cam slot to effect rotation of said spindle relative to said quill upon axially traversing said spindle in said bore, an adjustable stop on said frame positioned to contact said boring head to limit the latter to the initial boring position, means connecting said drive head and said boring head to successively, traverse the latter to said stop, and said tool to complete the boring operation, comprising a fluid cylinder in said body having a piston dividing said cylinder into upper and lower chambers, a piston rod connected to said drive head, said upper and lower chambers interconnected by a pair of fluid passages, said cylinder and said passages comprising a completely closed circuit, a check valve in one of said passages to restrict free flow of fluid from said lower chamber to said upper chamber and a check valve in the other passage to allow fluid to flow from said upper chamber to said lower chamber.

2. In a machine tool having a frame and a slide, a taper boring device comprising a drive head having a drive shaft and shiftable on said slide, a boring head shiftable on said slide and comprising a body, a quill rotatable co-axially with said shaft and provided with an internal bore eccentric with said shaft, said shaft being of a length sufficient to extend within said internal bore, a cap slidably keyed to said shaft and secured to said quill, an extension on said shaft concentric with said internal bore, a spindle rotatable in said bore and provided with a cutting tool, means to connect said extension and said spindle for independent rotation, said spindle having a spiral cam slot extending about the periphery thereof, a follower in said quill co-acting with said cam slot to effect rotation of said spindle relative to said quill upon axially traversing said spindle in said bore, a stop on said frame co-operating with said boring head to limit traverse of the latter, means associated with said drive head and said boring head to successively, traverse the said boring head to contact with said stop, and traverse said cutting tool to complete the boring operation, comprising a fluid cylinder having a piston dividing said cylinder into upper and lower chambers, a piston rod connected to said drive head, said upper and lower chambers mutually interconnected by a pair of fluid passages, a check valve in one of said passages to restrict free flow of fluid from said lower chamber to said upper chamber, and a check valve in the other passage to allow fluid to flow from said upper chamber to said lower chamber.

3. In a machine tool having a frame, a taper boring device comprising a drive head having a drive shaft, and a boring head, said heads shiftable on said frame, said boring head comprising a body, a quill rotatable co-axially with said shaft and provided with an internal bore eccentric with said shaft, said shaft being of a length sufficient to extend within said internal bore, a cap slidably keyed to said shaft and secured to said quill, a spindle rotatable in said bore and provided with a cutting tool, means connecting said spindle and said shaft for free relative rotation and dependent axial displacement, said spindle having a spiral cam slot extending about the periphery thereof, a follower in said quill engaging said cam slot to effect rotation of said spindle relative to said quill upon axially traversing said spindle in said bore, means associated with said drive head and said boring head to successively, traverse said boring head, and said spindle within said bore, comprising a fluid cylinder having a piston dividing said cylinder into upper and lower chambers, a piston rod connected to said drive head, said upper and lower chambers interconnected by a pair of fluid passages, said cylinder and said passages comprising a completely closed circuit, a check valve in one of said passages to restrict unimpeded flow of fluid from said lower chamber to said upper chamber, a check valve in the other passage to allow fluid to flow from said upper chamber to said lower chamber and stop means on said frame to limit the position of said boring head to a predetermined position.

4. In a machine tool having a frame provided with a stop thereon and a power head, a taper boring device comprising a drive shaft extending from said power source, and a boring head engageable with said stop, said boring head comprising a body portion, a quill rotatable in said body portion concentric with said shaft slidably keyed thereto, and driven thereby, said quill provided with an internal bore eccentrically positioned with respect to the axis of said shaft, a spindle rotatable in said bore and provided with a cutting tool, means eccentric with said shaft and concentric with said spindle effecting mutual connection for independent rotation, said spindle having an axially-advancing cam slot on the periphery thereof, a follower in said bore and fixed to said quill and engaging said slot to effect rotation of said spindle relative to said quill upon axially traversing said spindle in said bore, means to traverse said shaft into said bore to effect rotation and axial traverse of said spindle relative to said quill, and fluid displacement means intermediate said power head and said boring head to maintain the latter in contact with said stop.

5. In a machine tool having a frame provided with a stop thereon and a drive shaft, a taper boring head comprising a body abutting said stop, a quill fixed axially and rotatable in said body, co-axial with said shaft and provided with an internal bore eccentric with said shaft, said shaft being of a length sufficient to extend within said internal bore, said shaft slidably keyed to said quill to effect rotation of said quill, a spindle rotatable in said bore and provided with a cutting tool, means connecting said spindle and said shaft for free independent rotation and dependent axial displacement, said spindle having a spiral cam slot extending in an axial direction about the periphery thereof, a follower in said bore and fixed to said quill and engaging said cam slot to effect rotation of said spindle relative to said quill upon an axial traverse of said spindle in said bore, stop means to locate said boring head in operating position, and fluid displacement means cooperating with said drive shaft and said boring head to maintain the latter in positive contact with said stop during the boring operation.

6. In a machine tool having a vertical guideway and provided with a stop, and a drive head shiftable on said guideway and provided with a splined shaft, a taper boring head adjacent said drive head, shiftable on said guideway and abutting said stop, said boring head comprising a body portion having a rotatable quill the axis thereof being co-axial with the axis of said shaft, said quill having a cylindrical bore eccentric to the axis of said quill, a spindle in said cylindrical bore having a cam slot in the periphery thereof, a follower fixed against displacement relative to said quill and engaging said cam slot to effect partial rotation of said spindle relative to said quill upon axial shifting of said spindle and cutting means fixed to said spindle.

7. In a machine tool having a frame and a stop thereon, a taper boring device comprising a body shiftable on said frame and abutting said stop and having a cylindrical rotatable quill, said quill provided with a rotatable spindle having an axis eccentrically positioned with respect to the axis of rotation of said quill, a shaft co-axial with said quill and slidably keyed thereto, said spindle provided with a cam slot on the periphery thereof, a follower fixed against displacement relative to said quill and engaging said cam slot to effect partial rotation of said spindle relative to said quill upon axial shifting of said spindle.

8. In a machine tool having a frame, a driving head mounted thereon, a boring head independently slidable relative to said driving head, a stop on said frame, means to hold said boring head in working position against said stop, comprising a fluid cylinder integral with said boring head fluid therein, a piston in said cylinder dividing said cylinder into upper and lower chambers, a piston rod in said cylinder connected to said driving head and secured to said piston, a plurality of passages in said boring head connecting said upper and lower chambers, said cylinder and said passages constituting a closed circuit, a uni-directional check valve in one of said passages to permit flow of said fluid from said lower chamber to said upper chamber upon downward movement of said piston and a uni-directional check valve in another passage to allow fluid to flow from said upper chamber to said lower chamber upon an upward movement of said piston in said cylinder.

9. In a machine tool having a frame, a driving head mounted thereon, a boring head independently shiftable on said frame, a stop on said frame, means to hold said boring head in working position against said stop, comprising a fluid cylinder, integral with said boring head a piston in said cylinder dividing said cylinder into upper and lower chambers fluid in said cylinder, a piston rod in said cylinder connected to said driving head and said piston, said cylinder provided with a plurality of fluid passages interconnecting said upper and lower chambers, said cylinder and said passages constituting a closed circuit, a uni-directional check valve in one of said passages to permit flow of fluid from said lower chamber to said upper chamber upon downward movement of said piston and a uni-directional check valve in another passage to allow fluid to flow from said upper chamber to said lower chamber upon an upward movement of said piston in said cylinder.

10. In a machine tool having a power source and a drive shaft connected thereto, in combination, a taper-boring device comprising a boring head, said boring head comprising a body portion, a quill rotatable in said body portion in co-axial relation with said shaft and driven thereby, said quill provided with an internal bore eccentrically positioned with respect to the axis of said shaft, a spindle rotatable in said bore, means eccentric with said shaft and concentric with said spindle effecting a connection between said shaft and said spindle for independent rotation, and a cam-and-follower means intermediate said spindle and said quill to effect rotation of said spindle relative to said quill upon axially traversing said spindle in said bore, said follower being fixed in said bore against displacement.

11. In a machine tool having a shaft, a taper boring device comprising a boring head, said boring head comprising a body portion, a quill rotatable in said body portion co-axially with said shaft and driven thereby, said quill provided with an internal bore eccentrically positioned with respect to the axis of said shaft, a spindle rotatable in said bore, said shaft having a rotatively-independent connection with said spindle for lateral displacement therewith, a cam-and-follower means intermediate said spindle and said quill to effect rotation of said spindle relative to said quill upon axially traversing said spindle in said bore, said follower being fixed in said bore against displacement.

References Cited in the file of this patent
UNITED STATES PATENTS

| Number | Name | Date |
|---|---|---|
| 706,688 | Reynders et al. | Aug. 12, 1902 |
| 1,226,164 | Austin | May 15, 1917 |
| 1,998,873 | Kingsbury | Apr. 23, 1935 |
| 1,999,393 | Bullard | Apr. 30, 1935 |
| 2,182,770 | Woodcock | Dec. 5, 1939 |